United States Patent

Ackley et al.

[11] Patent Number: 5,844,222
[45] Date of Patent: Dec. 1, 1998

[54] RASTERING LASER SCANNER WITH BEAM LOCATION FEEDBACK

[75] Inventors: H. Sprague Ackley, Seattle; Christopher A. Wiklof, Everett, both of Wash.

[73] Assignee: Intermec Corporation, Everett, Wash.

[21] Appl. No.: 674,581

[22] Filed: Jul. 2, 1996

[51] Int. Cl.⁶ ..................................................... G06K 7/10
[52] U.S. Cl. .......................... 235/454; 235/462; 235/467
[58] Field of Search .................................. 235/454, 462, 235/472, 456, 463, 467; 250/221

[56] References Cited

U.S. PATENT DOCUMENTS

| | | | |
|---|---|---|---|
| 3,169,186 | 2/1965 | Howard | 235/462 |
| 4,408,120 | 10/1983 | Hara et al. | 235/462 |
| 4,724,322 | 2/1988 | Knowles et al. | 250/341 |
| 4,906,843 | 3/1990 | Jones et al. | 235/472 |
| 4,980,547 | 12/1990 | Griffin | 250/221 |
| 4,986,662 | 1/1991 | Bures | 250/221 |
| 4,998,014 | 3/1991 | Hasegawa | 250/221 |
| 5,033,065 | 7/1991 | Keromnes et al. | 250/221 |
| 5,113,268 | 5/1992 | Yoshida et al. | 358/474 |
| 5,137,354 | 8/1992 | DeVos et al. | 356/152 |
| 5,138,140 | 8/1992 | Siemiatkowski et al. | 235/462 |
| 5,140,146 | 8/1992 | Metlitsky et al. | 235/462 |
| 5,196,836 | 3/1993 | Williams | 250/221 |
| 5,216,230 | 6/1993 | Nakazawa | 235/462 |
| 5,247,162 | 9/1993 | Swartz et al. | 235/467 |
| 5,298,737 | 3/1994 | Proper | 250/221 |
| 5,313,508 | 5/1994 | Ditman et al. | 250/221 |
| 5,325,305 | 6/1994 | Rezaei | 364/468 |
| 5,369,262 | 11/1994 | Dvorkis et al. | 235/462 |
| 5,393,967 | 2/1995 | Rice et al. | 235/454 |
| 5,448,050 | 9/1995 | Kostizak | 235/454 |
| 5,523,552 | 6/1996 | Shellhammer et al. | 235/462 |
| 5,532,846 | 7/1996 | Brook et al. | 358/497 |
| 5,534,684 | 7/1996 | Danielson | 235/472 |
| 5,561,283 | 10/1996 | Dvorkis et al. | 235/462 |
| 5,565,668 | 10/1996 | Reddersen et al. | 235/462 |
| 5,572,006 | 11/1996 | Wang et al. | 235/454 |
| 5,596,446 | 1/1997 | Plesko | 235/462 |
| 5,600,116 | 2/1997 | Seo et al. | 235/454 |
| 5,600,119 | 2/1997 | Dvorkis et al. | 235/462 |
| 5,633,489 | 5/1997 | Dvorkis et al. | 235/462 |
| 5,684,578 | 11/1997 | Nower et al. | 356/141.3 |
| 5,699,180 | 12/1997 | Urakawa et al. | 359/208 |
| 5,710,425 | 1/1998 | McConica et al. | 250/234 |

Primary Examiner—Donald T. Hajec
Assistant Examiner—Douglas X. Rodriguez
Attorney, Agent, or Firm—Graham & James LLP

[57] ABSTRACT

A method and apparatus is provided for reading two-dimensional patterns, such as matrix symbols or signatures, using moving beam laser scanners to take advantage of the large depth of field inherent in laser scanners. A pixel generating element and a tracking element together create a digitized image of a target symbol by scanning a laser beam across the symbol. As the pixel generating element generates pixel data composing the digitized image, the tracking element tracks the position of the laser beam in the scanning pattern, and generates laser position data indicating the instantaneous position of the laser associated with particular pixels. The laser position data is then stored in a data memory in association with the generated pixel data, and a microprocessor utilizes the stored pixel data and laser position data to create an image of the target symbol.

24 Claims, 3 Drawing Sheets

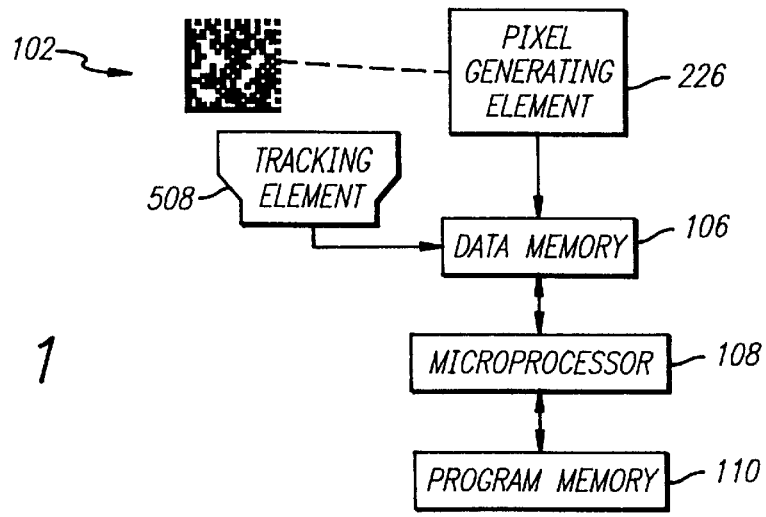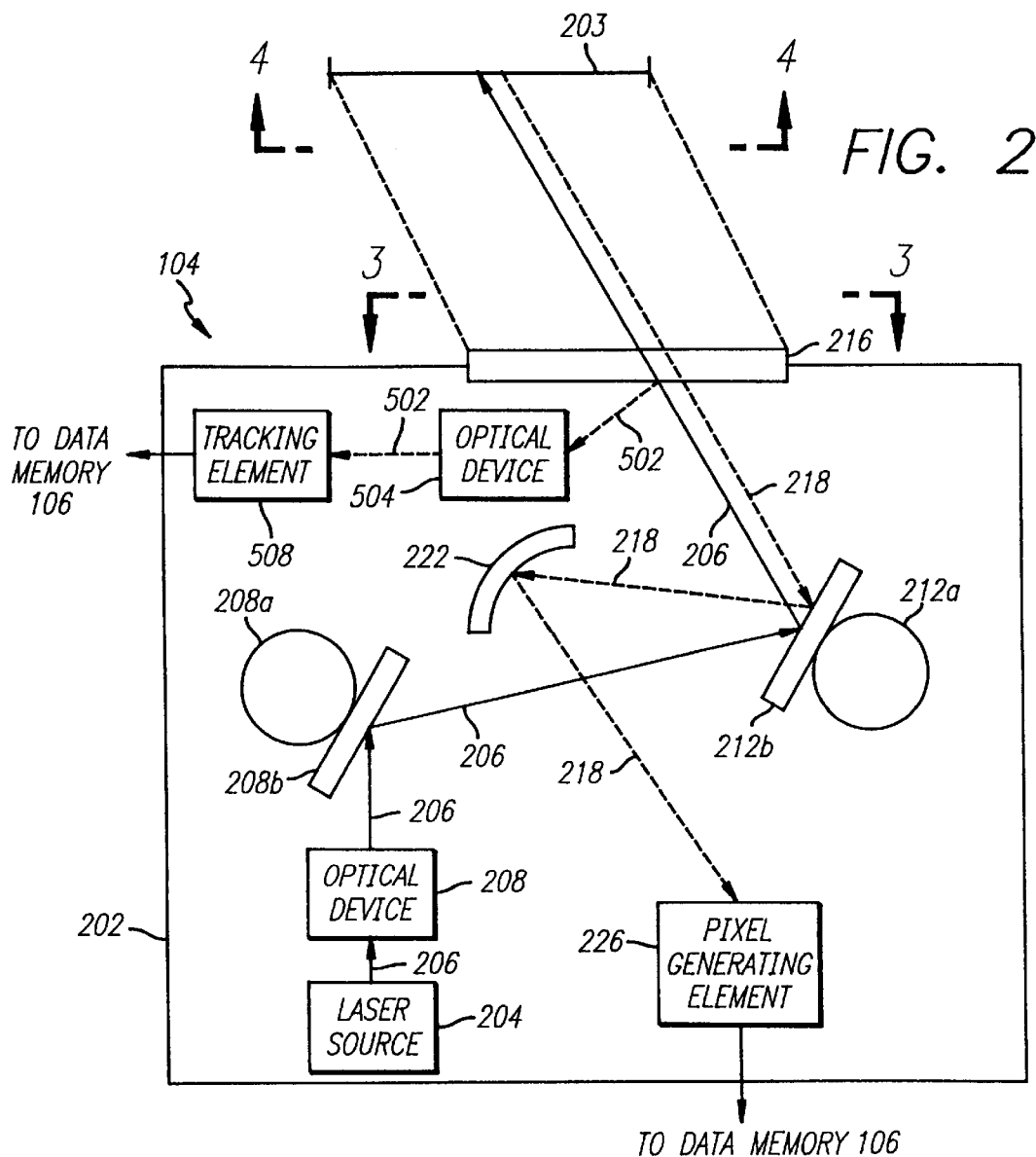

RASTERING LASER SCANNER WITH BEAM LOCATION FEEDBACK

BACKGROUND OF THE INVENTION

1. Field of the Invention

The present invention relates to moving beam laser scanners for reading bar code symbols, and more particularly, to a beam location feedback system that tracks the instantaneous laser beam position as the beam sweeps through a pattern to enable reading of two-dimensional bar code symbols.

2. Description of Related Art

Optical imaging systems are commonly used to decipher data symbols printed on objects in order to identify the objects. A conventional bar code symbol comprises a one-dimensional pattern of vertical bars of various widths separated by spaces of various widths. The term "symbology" is used to describe the unambiguous rules specifying the way data is encoded into the bar and space widths. Since the bar and space elements have different light reflecting characteristics, a scanner can convert the bar code symbol into an electrical signal by analyzing the light reflected from the symbol. The electrical signal can then be decoded to recover an alphanumeric representation of the symbol which identifies the object. Bar code symbols of this nature are now in common usage in various types of applications, such as inventory control, point of sale identification, or logistical tracking systems.

The bar code scanner typically uses a light source that is scanned across the bar code field. Since the bar code symbol is often disposed on the object to be identified, it is desirable for the scanner to be included in a hand held or portable device so that the scanner can be brought to the object. A bar code scanner may include an internal electromechanical system that automatically articulates the light source back and forth at a high rate to scan across the bar code field. Such moving beam scanners usually employ either a helium-neon or solid-state laser as a light source. The scanning motion is provided by rotating or oscillating mirrors inside the scanner, which can achieve a typical scan rate of approximately 40 scans per second. Such moving beam handheld scanning devices are advantageous since they require little operator skill and are capable of effectively reading suboptimum quality symbols by employing a large number of scanning attempts in a short period of time.

Since the conventional one-dimensional bar code symbols require a relatively large amount of space to convey a correspondingly small amount of data, two-dimensional bar code symbols have been developed. There are two types of two-dimensional bar code symbols: stacked row symbols, and matrix symbols.

A stacked row symbol typically comprises a plurality of one-dimensional bar codes stacked one on top of the other. Because information indicating the location of particular data elements in a stacked row symbol is encoded into the symbol itself, the alphanumeric data encoded into a stacked row symbol can be correctly decoded even if the symbol is scanned in a sequence that is different than the order in which the data is encoded. For this reason, a stacked row symbol can be scanned using a traditional hand held moving beam scanner.

A matrix symbol typically comprises a square or rectangular matrix of round or square dots disposed in rows and columns. Examples of commercially available matrix symbols include Code One and Data Matrix. Unlike stacked row symbols, matrix symbols do not include information indicating the location of particular data elements within the symbol. As a result, matrix symbols can encode significantly more data in a given area than stacked row symbols, but matrix signals cannot be read using conventional handheld moving beam scanners.

Instead, two-dimensional symbology imagers have been developed that can convert the symbol into pixel information that is deciphered into the alphanumeric information represented by the symbology data. Two-dimensional imagers may utilize two-dimensional charge-coupled device (CCD) technology to convert optical information from the symbology data into an electrical signal, and require a light source to illuminate the symbol adequately to enable detection by the CCD device. A drawback of the CCD imagers is that they have smaller depth of field than the moving beam scanners, requiring the handheld imagers to be more carefully aimed at the two-dimensional symbols in order to obtain a satisfactory image.

Accordingly, it would be desirable to provide a moving beam rastering laser scanner capable of scanning a two-dimensional matrix bar code symbol in order to take advantage of the inherently greater depth of field characteristics of such devices.

SUMMARY OF THE INVENTION

In accordance with the teachings of the present invention, a laser scanning system is provided for creating a digitized image of a two-dimensional printed symbol. The system includes both a pixel generating element for generating pixel values by recording the amount of light reflected off of a symbol and a tracking element. Together, the pixel generating element and the tracking element create a digitized image of a target symbol by directing a rasterized laser beam onto the symbol. As the pixel value generating element generates pixel values, the tracking element tracks the position of the laser beam as it scans across the target pattern and generates laser position data indicating the instantaneous position of the laser associated with particular pixels. The laser position data is stored in a data memory in association with the generated pixel data. The pixel data and the position data are then utilized to create a digitized image of the target symbol.

A more complete understanding of the present invention will be afforded to those skilled in the art, as well as a realization of additional advantages and objects thereof, by a consideration of the following detailed description of the preferred embodiment. Reference will be made to the appended sheets of drawings which will first be described briefly.

BRIEF DESCRIPTION OF THE DRAWINGS

FIG. 1 is a block diagram of an imaging system embodying the teachings of the present invention;

FIG. 2 is a block diagram of an exemplary embodiment of the present invention;

DETAILED DESCRIPTION OF THE PREFERRED EMBODIMENT

Figure 3:
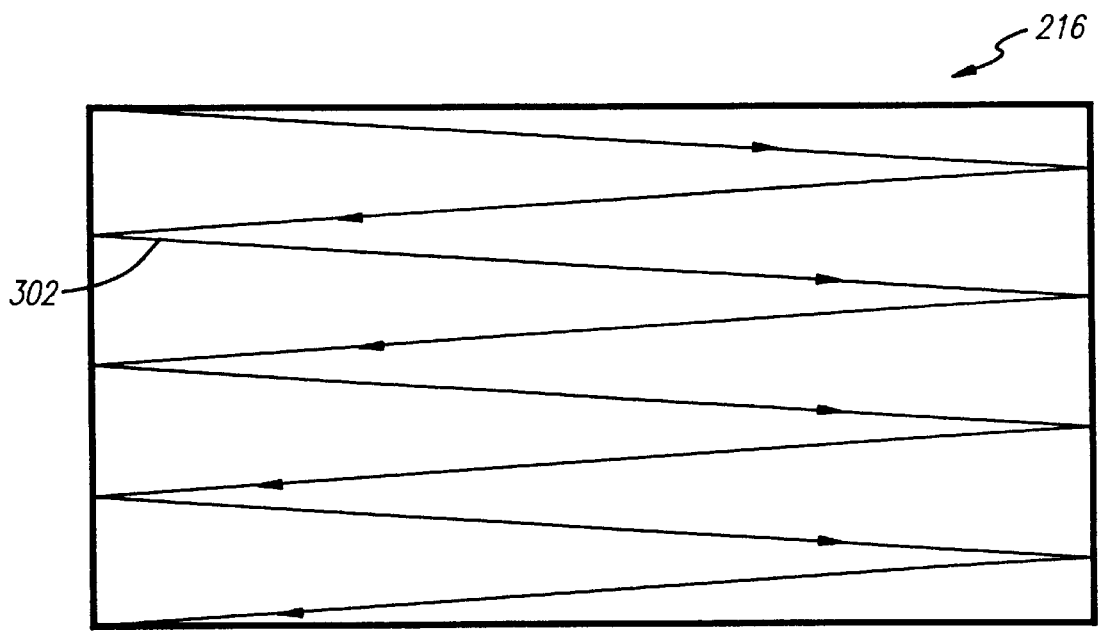
FIG. 3 illustrates a raster pattern of the laser beam generated on the window element of FIG. 2 as taken through the section 3—3.

The present invention satisfies the need for a method and apparatus for reading two-dimensional patterns, such as matrix symbols or signatures, using a laser scanner to take advantage of the depth of field characteristics inherent in laser scanners. In the detailed description that follows, like element numerals are used to describe like elements in one or more figures.

Referring first to FIG. 1, an imaging system that includes the teachings of the present invention is illustrated. The system includes a pixel generating element 226, a tracking element 508, a data memory 106, a microprocessor 108, and a program memory 110. The pixel generating element 226 generates a plurality of digitized data values representing picture elements (or "pixels") of a target symbol, such as the exemplary symbol 102. As will be explained in more detail below, the pixel generating element 226 does so by scanning a laser beam across the target symbol 102, and converting reflected light into a plurality of pixel values, which are stored in the data memory 106. The data memory 106 can comprise a semiconductor-based random access memory (RAM).

As will also be explained in more detail below, the tracking element 508 tracks the position of the laser beam as it is scanned across the target symbol 102. In association with at least some of the pixels, the tracking element 508 generates laser position data indicating the instantaneous position of the laser beam at the time those pixels were generated. The laser position data is then stored in the data memory 106 in correspondence with the associated pixels.

Laser position data may be generated and stored for every pixel generated by the pixel generating element 226. Alternatively, laser position data may be generated and stored for only some of the pixels, such as, for example, every n$^{th}$ pixel generated by the pixel generating element 226. In such a case, interpolation techniques may be used to determine position data for those pixels for which no position data is generated and stored in the data memory 106.

The microprocessor 108 controls one or more operations of the imaging system in accordance with instruction sets, e.g., software or firmware, stored in a program memory 110. For example, the microprocessor 108 may control the generation of pixel data and laser position data by controlling the pixel generating element 226 and the tracking element 508, respectively. The microprocessor 108 may also control the creation of the digitized image of the target symbol 102 utilizing pixel data and laser position data stored in the data memory 106. The microprocessor 108 may additionally control various data processing operations such as the decoding of the image data, the transfer of the image data to other systems, etc. Any conventional microprocessor may be used with the present invention, such as the TI-C30 processor available from Texas Instruments, Inc. The program memory 110 can be provided by conventional semiconductor-based read only memory (ROM) devices. Such ROM devices are non-volatile and permit the stored instructions to remain in storage within the devices even after electrical power is removed.

It should be apparent that the functions performed by the stored instruction set may also be accomplished by traditional hard wired circuits, but software or firmware systems are preferred due to their relative simplicity, adaptability to change, and low cost. It should also be apparent that the ROM devices may further be erasable or programmable, so that modifications or revisions to the software can be implemented as desired. Moreover, other permanent storage media can be utilized as program memory 110, such as magnetic or optical disks.

The entire imaging system, including the pixel generating element 226, the tracking element 508, the data memory 106, the microprocessor 108, and the program memory 110 may be contained within a single unit. Alternatively, the elements may be distributed, such as with the pixel generating element 226 and the tracking element 508 disposed in a remote device and the other elements disposed in a central unit. This way a simple, lightweight unit can be used to create image data and transmit the data to a central unit for further processing. The image data may then be transmitted to an attached computer, stored locally for later transfer or forwarded to an application program resident within the imaging system itself.

Figure 4:
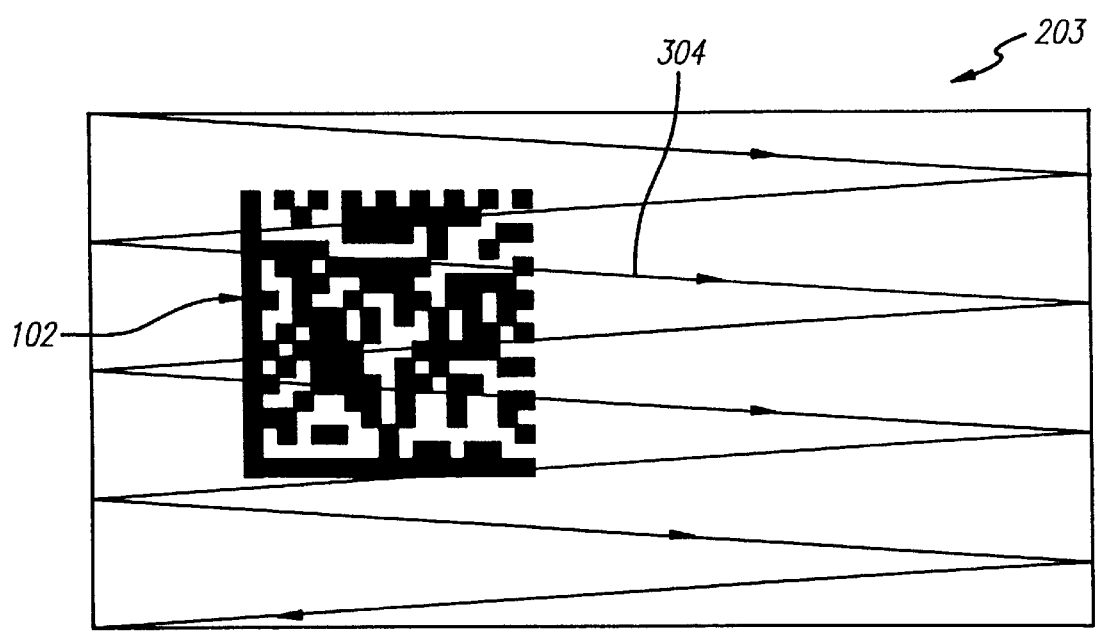
FIG. 4 illustrates the raster pattern of the laser beam on a target area as taken through the section 4—4.

Operation of an exemplary embodiment of the present invention will now be explained with reference to FIGS. 2–4. FIG. 2 contains a block diagram illustrating an exemplary embodiment of the present invention, which includes a housing 202 having a window 216. A laser source 204 generates a laser beam 206, and an optical device 208, such as a lens or mirror, directs the laser beam 206 onto a first movable mirror 208b. The first movable mirror 208b directs the laser beam 206 onto a second movable mirror 212b, which directs the beam through the window 216 in the housing and onto a "spot" of a target area 203.

Laser light reflects off of the illuminated spot of the target area 203 and returns through the window 216 to the second movable mirror 212b. The second movable mirror 212b directs the returning laser light 218 onto a reflecting mirror 222, which directs the returning laser light onto a pixel generating element 226, which may comprise a photodetector. The pixel generating element 226 converts the returning laser light 218 into a digital data value representing a pixel of the target area 203 at the illuminated spot.

A first motor 208a is connected to the first moveable mirror 208b. The first motor 208a repeatedly moves the first moveable mirror 208b in a first pattern, which imparts the first pattern to the laser beam 206 as the laser beam is directed onto the second movable mirror 212b. A second motor 212a likewise repeatedly moves the second moveable mirror 212b in a second pattern, which imparts the second pattern to the laser beam 206 as the beam is directed through the window 216. Accordingly, as the laser beam 206 passes through the window 216, the beam moves in a pattern that comprises both the first pattern and the second pattern.

Preferably, both the first and the second patterns are dithering motions with one motion being horizontal with respect to the window 216 and the other being vertical. In such a case, the combined movements of the first and second movable mirrors 208b, 212b would impart a raster pattern to the laser beam 206 as it passes through the window 216. An exemplary raster pattern is illustrated in FIG. 3, which shows a side view of the window 216. This causes the laser "spot" to move across the target area 203 in a similar raster pattern, as illustrated in FIG. 4, which shows a side view of the target area 203. For the sake of simplicity, the raster pattern illustrated in FIGS. 3 and 4 is a coarse pattern. An actual raster pattern generated by operation of the present invention would, however, be considerably finer.

Although two dithering mirrors 208b, 212b are illustrated in the exemplary embodiment illustrated in FIG. 2, it should be apparent that alternative structures could be utilized to impart a pattern to the laser beam 206. An example of such an alternative structure includes a vibrating mylar sheet. Moreover, although the pattern illustrated in FIGS. 3 and 4 is a raster pattern, it should also be apparent that any pattern, including a random pattern, may be imparted to the laser beam 206, as long as the pattern is such that the laser "spot" eventually hits most elements of the target symbol 102.

The microprocessor 108 controls operation of the system such that as the laser beam 206 moves in the raster pattern, a series of pixel values are generated by the pixel generating element 226 and stored in the data memory 106. The stored pixel values represent a digitized image of the target area 203. If a coded symbol, such as the exemplary symbol 102, is located within the target area 203, the digitized image will include at least part of the symbol.

Moreover, as the laser beam 206 passes through the window 216, a small amount of the laser light 502 reflects off of the window and back into the housing 202. An optical device 504, which may comprise a lens or a mirror, directs that reflected light 502 onto the tracking element 508, which may comprise a charge coupled device (CCD). As known in the art, a CCD comprises a two-dimensional array of adjacent photodiodes. As the reflected light 502 hits a particular photodiode, that photodiode generates an electric signal, indicating the position of the reflected light on the CCD. Because each photodiode corresponds to a particular area of the window 216, the signals generated by the CCD correspond to the instantaneous position of the laser beam 206 on the window.

The microprocessor 108 controls operation of the system such that digital position data generated by the CCD 508 are stored in the data memory in association with at least some of the pixels generated by the pixel generating element 226. In this manner, particular pixels of the digitized image stored in the data memory 106 are mapped to the instantaneous location of the laser beam 206 at the time those pixels were generated.

Figure 5A:
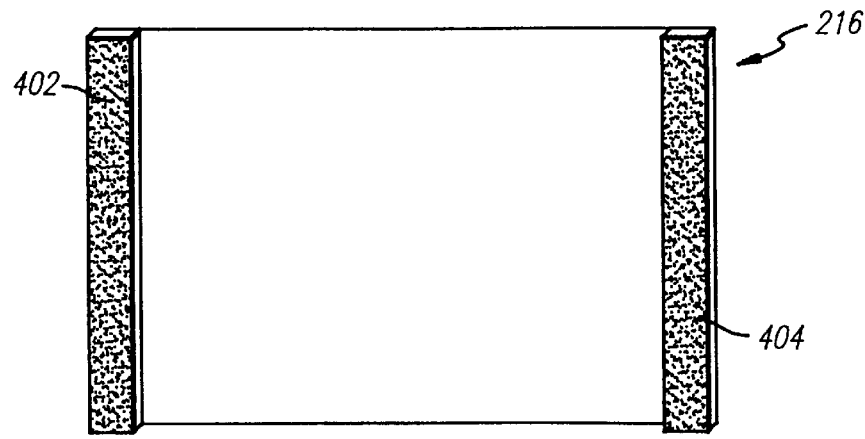
FIGS. 5a–5c illustrate alternative embodiments of the window element of FIG. 2.
Figure 5B:
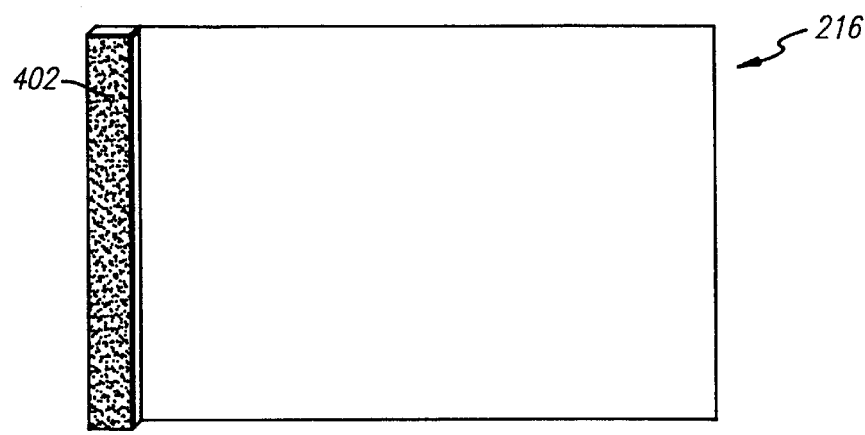
Figure 5C:
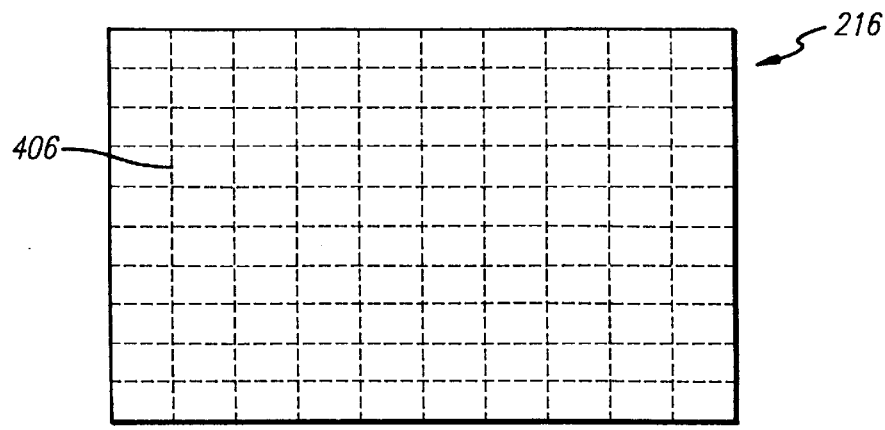

Referring next to FIGS. 5a–5c, several alternative embodiments of the window 216 are illustrated. In each of the illustrated embodiments, the tracking element 508 for determining the instantaneous position of the laser beam 206 as it passes through the window 216 is incorporated into the window itself. Accordingly, the optical device 504 would not be needed in an embodiment of the present invention that includes one of the windows illustrated in FIGS. 5a–5c.

In FIG. 5a, the illustrated window 216 includes two linear arrays of photodiodes 402, 404, which are disposed along opposite ends of the window 216 such that both arrays are within the path of the laser beam 206 as it sweeps across the window. As the laser beam 206 crosses one of the arrays 402, 404, the laser beam illuminates and activates a particular photodiode, indicating the instantaneous position of the laser beam. As with the embodiment described above in connection with FIG. 2, the laser position data generated by the photodiode arrays 402, 404 are stored in the data memory thereby allowing the calculation of the location of all corresponding pixels generated by the pixel generating element 216.

FIG. 5b illustrates a variation of the embodiment illustrated in FIG. 5a. The embodiment illustrated in FIG. 5b utilizes one linear array of photodiodes disposed along one edge of the window 216. Operation of the present invention with the window illustrated in FIG. 5b is similar to the operation described above with regard to FIG. 5a.

FIG. 5c illustrates yet another variation of the window 216 of FIG. 2. In FIG. 5c, a plurality of small, photosensitive wires 406 (illustrated as dotted lines) are embedded in the window 216. The wires 406 could alternatively be arranged on the surface of the window 216. As the laser beam 206 passes through the window 216 and contacts a wire 406, the wire generates a voltage and/or current that is proportional to the position of the laser beam along the wire. Currents and/or voltages from all the wires 406 are then converted into a digital value indicating the instantaneous position of the laser beam 206 on the window 216, and that digital value is stored in the data memory 106 in correspondence with pixel data generated by the pixel generating element 216.

Having thus described a preferred embodiment of the invention, it should be apparent to those skilled in the art that certain advantages have been achieved. It should also be appreciated that various modifications, adaptations and alternative embodiments thereof may be made within the scope and spirit of the present invention. For example, although the exemplary embodiment of the present invention illustrated in FIG. 2 includes two movable mirrors 208b, 212b and two associated motors 212a, 212b, a single movable mirror and motor could alternatively be used. In such an embodiment, the motor would move the mirror in a two-dimensional pattern. Also, although the present invention was described above as being used to create a digital image of an exemplary two-dimensional coded symbol 102, the present invention could be used to create a digitized image of any type of two-dimensional printed pattern, including a handwritten signature.

The invention is limited only by the following claims.

What is claimed is:

1. A laser scanning apparatus comprising:

a window;

means for scanning laser light in a two-dimensional pattern through said window and onto a target area; and means for determining an instantaneous position of said laser light along said window at a point which said laser light passes through said window.

2. A laser scanning apparatus comprising:

a window;

means for scanning laser light through said window and onto a target area; and means for determining an instantaneous position of said laser light as said laser light passes through said window, wherein said determining means comprises an array of photodiodes oriented to permit a portion of said laser light that reflects off of said window to impinge thereon.

3. A laser scanning apparatus comprising:

a window;

means for scanning laser light through said window and onto a target area; and means for determining an instantaneous position of said laser light as said laser light passes through said window, wherein said determining means comprises at least one array of photodiodes disposed along at least one boundary of said window.

4. A laser scanning apparatus comprising:

a window;

means for scanning laser light through said window and onto a target area; and means for determining an instantaneous position of said laser light as said laser light passes through said window, wherein said determining means comprises a plurality of spaced apart photosensitive electrical conductors disposed in parallel to a plane of said window.

5. The apparatus of claim 1, wherein said scanning means comprises at least one movable mirror, and at least one motor for moving said at least one movable mirror.

6. The apparatus of claim 1, wherein said scanning means comprises:

a first mirror movable in a first direction; and a second mirror movable in a second direction.

7. The apparatus of claim 1, wherein said pattern is a raster pattern.

8. The apparatus of claim 1 further comprising:

means for receiving laser light that has passed though said window and reflected off of said target area; and means for generating digitized image data of said target area utilizing said received light.

9. The apparatus of claim 8 further comprising memory means for storing said position determined by said determining means.

10. The apparatus of claim 9, wherein said memory means further stores said position determined by said determining means in association with said image data generated by said generating means.

11. A laser scanning method comprising:

scanning laser light in a two-dimensional pattern through a window and onto a target area; and determining an instantaneous position of said laser light along said window at a point which said laser light passes through said window.

12. The method of claim 11, wherein said pattern is a raster pattern.

13. The method of claim 11 further comprising:

receiving laser light that has passed though said window and reflected off of said target area; and generating a digitized image of said target area utilizing said received light.

14. The method of claim 11 further comprising storing said position determined at said determining step.

15. The method of claim 14, wherein said storing step further stores said position determined at said determining step in association with said image data generated at said generating step.

16. An apparatus comprising:

a window;

a movable mirror disposed so as to reflect laser light through said window and onto a target area;

a motor movably connected to said movable mirror so as to move said movable mirror to cause said laser light to sweep through a two-dimensional pattern; and means for determining a position of said laser light along said window at a point which said laser light passes through said window.

17. An apparatus for forming a two-dimensional image, comprising:

a laser light emitter adapted to emit a beam of laser light and means for sweeping said laser light beam through a two-dimensional pattern;

a detector oriented to detect an instantaneous position of said laser light beam as said laser light beam sweeps through said pattern to provide position data;

an imaging sensor oriented to receive said laser light beam after having reflected off of a target surface area to provide image data; and means for correlating said position data with said image data to reconstruct a two-dimensional image of said target surface area.

18. The apparatus of claim 17, wherein said target surface area further comprises a two-dimensional bar code symbol.

19. The apparatus of claim 17, wherein said detector further comprises:

a window oriented to permit said sweeping laser light beam to pass therethrough; and at least one array of photodiodes oriented with respect to said window to permit a portion of said laser light beam to impinge thereon.

20. The apparatus of claim 19, wherein said at least one array of photodiodes are disposed along at least one boundary of said window.

21. The apparatus of claim 17, wherein said detector further comprises:

a window oriented to permit said sweeping laser light beam to pass therethrough; and a plurality of spaced apart photosensitive electrical conductors disposed in parallel to a plane of said window and oriented to permit a portion of said laser light beam to impinge thereon.

22. The apparatus of claim 17, wherein said two-dimensional pattern further comprises a raster pattern.

23. A method for forming a two-dimensional image, comprising the steps of:

emitting a beam of laser light and sweeping said laser light beam through a two-dimensional pattern;

detecting an instantaneous position of said laser light beam as said laser light beam sweeps through said pattern to provide position data;

receiving said laser light beam after having reflected off of a target surface area to provide image data; and correlating said position data with said image data to reconstruct a two-dimensional image of said target surface area.

24. The method of claim 23, wherein said detecting step further comprises the steps of:

passing said laser light beam through a window; and detecting instantaneous points at which said laser light beam passes through said window.

* * * * *